(12) United States Patent
Garcia-Luna-Aceves et al.

(10) Patent No.: US 8,130,654 B2
(45) Date of Patent: Mar. 6, 2012

(54) CONTEXT-AWARE PACKET SWITCHING

(75) Inventors: Jose J. Garcia-Luna-Aceves, San Mateo, CA (US); Marc Mosko, Santa Cruz, CA (US); Ignacio Solis, Santa Cruz, CA (US); Rebecca L. Braynard Silberstein, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 726 days.

(21) Appl. No.: 12/260,434

(22) Filed: Oct. 29, 2008

(65) Prior Publication Data
US 2010/0103870 A1    Apr. 29, 2010

(51) Int. Cl.
*H04L 12/26* (2006.01)
(52) U.S. Cl. ........................................ 370/236
(58) Field of Classification Search ............ None
See application file for complete search history.

(56) References Cited

U.S. PATENT DOCUMENTS

| | | | |
|---|---|---|---|
| 6,788,702 B1 * | 9/2004 | Garcia-Luna-Aceves et al. | 370/458 |
| 2004/0037317 A1 * | 2/2004 | Zalitzky et al. | 370/466 |

* cited by examiner

*Primary Examiner* — Yong Zhou
(74) *Attorney, Agent, or Firm* — Shun Yao; Park, Vaughan, Fleming & Dowler LLP

(57) ABSTRACT

Embodiments of a communication system, a method, and a device for use with the communication system are described. Communication between the devices in the communication system may be enabled by the method. In particular, nodes or devices (henceforth referred to as devices) in a network (such as an ad-hoc network) in the communication system may exchange a dynamic network context via communication with neighboring devices. These devices may use the dynamic network context to determine how network resources are shared during the communication, including performing context-aware packet switching of packets (including data packets) in an information flow.

21 Claims, 8 Drawing Sheets

PACKET HEADER
800

TIME-SLOT HEADER
830

PACKET HEADER
860

CONTEXT-AWARE PACKET SWITCHING

CROSS REFERENCE TO RELATED APPLICATIONS

This application is related to co-pending U.S. patent application Ser. No. 11/644,663, filed on Dec. 21, 2006, entitled "Distributed Context-Aware Scheduled Access in a Network," the contents of which are herein incorporated by reference.

BACKGROUND

1. Field of the Invention

The present invention relates to techniques for managing communication in a network. More specifically, the present invention relates to an in-band integrated signaling technique which is based on a distributed network context in a network of devices.

2. Related Art

Many communication systems continue to use protocols and architectures that were developed 40 years ago, when there were severe memory and processing constraints. For example, because of such constraints, the protocols in the Advanced Research Projects Agency Network (ARPANET) were organized into a network protocol stack in which: most protocols were decoupled from the physical medium, the protocol layers in the network protocol stack operated independently of each other, and processing and storage 'inside' the network was kept to a minimum. Consequently, the resulting packet-switching architecture was based on 'in-band, in-packet signaling,' which minimizes the use of in-network processing and storage resources, and maximizes the use of the links.

In this signaling architecture (which is sometimes referred to as 'packet switching based on an independent network protocol stack'), routers (the packet switches) maintain the minimum information needed to forward packets to the next destination or hop, and each packet contains a header and a payload, with the header carrying all the control information needed for each protocol layer of the network protocol stack. Moreover, each packet (which is sometimes referred to as a 'datagram') is switched independently of the other packets, as well as independently of the type (or intent) of its payload. Furthermore, all processing and storage of information occurs at the edges of the network (i.e., at the hosts). Thus, in this signaling architecture, there is a division of labor between hosts and routers.

Packet switching based on an independent network protocol stack continues to be used in the Internet Protocol (IP) of the Internet. This is typically adequate for wired segments of the Internet in which over-provisioning of links is feasible. However, this packet-switching architecture is often poorly suited to the needs of other portions of the Internet and other types of networks, such as mobile ad-hoc networks (MANETs). MANETs are very different than wired networks because of: device mobility, the characteristics of the radio channels, and the relative scarcity of bandwidth. In contrast with wired networks, the wireless portions of networks typically need to be ubiquitous and invisible. Thus, each node or device in a MANET usually acts as a host and a router, and providing users with service is typically more important than obtaining high-link utilization.

Furthermore, packet switching based on an independent network protocol stack can lead to significant inefficiency. This is because different protocol layers often have duplicate functionality, and the limited communication in the network protocol stack (which is typically restricted to neighboring protocol layers) constrains optimization. For example, using this signaling architecture to communicate 50 bytes of voice data in a data packet can require 200 bytes of header information to meet the requirements of the different protocol layers. Additionally, packet switching based on a network protocol stack does not take advantage of the in-network processing and storage resources available in current mobile devices (e.g., personal digital assistants, cellular telephones, etc.), which are orders of magnitude larger than what was available 40 years ago.

Hence, what is needed is a method and an apparatus that facilitates management of communication in communication systems without the problems listed above.

SUMMARY

One embodiment of the present invention provides a communication system that includes devices in a network (such as an ad-hoc network), which collect and store a dynamic network context via communication with neighboring devices. These devices use the dynamic network context to determine how network resources are shared during the communication, including performing context-aware packet switching of packets (including data packets) in an information flow. Moreover, these data packets include context-dependent parameters which depend on payloads in the data packets. Additionally, after the information flow has been established, the devices exclude constant field values, which are associated with multiple protocol layers in a network protocol stack (such as a network layer and a medium-access-control layer), from the data packets, thereby reducing overhead associated with the information flow.

Communication in the communication system may include wireless communication. Moreover, the communication may use a time-domain multiple-access (TDMA) communication protocol. Additionally, the information flow may include multi-hop communication between two end-point devices in the network via an intermediate device, and the dynamic network context may be revised on a hop-by-hop basis. Furthermore, the intermediate device may store a complete set of context information associated with the information flow, which allows the intermediate device to redirect the information flow as needed.

Note that the dynamic network context may include: information flows competing for shared network bandwidth, devices capable of causing interference at one or more receiving devices, characteristics of one or more links in the network, transmission schedules, transmission routes, and/or device positions.

In some embodiments, a transmitting device reserves one or more sub-channels (such as one or more time slots) in the network using a contention-free scheduling protocol.

Packets in the information flow may also include context packets. Both the context packets and the data packets may include a flow identifier corresponding to the information flow which allows devices in a transmission route associated with the information flow to access the constant field values which are included in the stored dynamic network context.

Revisions to the dynamic network context may be disseminated by the devices prior to transmitting a subsequent packet in the information flow (such as a context packet or a data packet), which allows the devices to determine how the network resources will continue to be shared during the communication.

Moreover, while determining how the network resources are shared during the communication, the devices may operate in a distributed fashion to make integrated scheduling, routing and congestion-control decisions for the network.

Additionally, the devices may communicate the dynamic network context in the context packets, which are separate from sets of data packets (including the data packets) in information flows. These context packets may be communicated using the same links in the network as the sets of data packets.

Another embodiment provides one of the devices for use in the communication system. This device includes: a transceiver configured to communicate a dynamic network context with neighboring devices in a network, memory, and control logic. This control logic collects the dynamic network context and stores it in the memory. Moreover, the control logic uses the network context to determine how the network resources are shared during the communication, including the context-aware packet switching of packets (such as the data packets) in the information flow. Furthermore, after the information flow has been established, the control logic includes a flow identifier in the packets, which is associated with the information flow, and includes context-dependent parameters in the data packets which depend on payloads in the data packets. Additionally, the control logic accesses constant field values of the information flow, which are associated with the multiple protocol layers in the network protocol stack, and which are stored in the dynamic network context in the memory, based on the flow identifier. These constant field values and the context-dependent parameters are used by the control logic to perform the context-aware packet switching.

Another embodiment provides a method for reducing overhead associated with an information flow in a network, which may be performed by the devices in the communication system. During operation, the devices transmit and receive the dynamic network context via communication between neighboring devices. Then, the devices store the dynamic network context. Next, one or more devices determine how the network resources are to be shared during the information flow based on the stored dynamic network context. Subsequently, the devices transmit and receive a revised dynamic network context to establish the information flow, and then the devices store the revised dynamic network context. This revised dynamic network context includes the constant field values of the information flow, which are associated with the multiple protocol layers in the network protocol stack.

Moreover, at least a subset of the devices transmits and receives packets (including the data packets) in the information flow. Note that packets include the flow identifier associated with the information flow, and the data packets include the context-dependent parameters which depend on the payloads in the data packets. Furthermore, the subset of devices access the constant field values of the information flow in the stored revised dynamic network context based on the flow identifier, and one or more of the devices in the subset of devices perform context-aware packet switching of the packets based on the constant field values and the context-dependent parameters.

Figure 1:
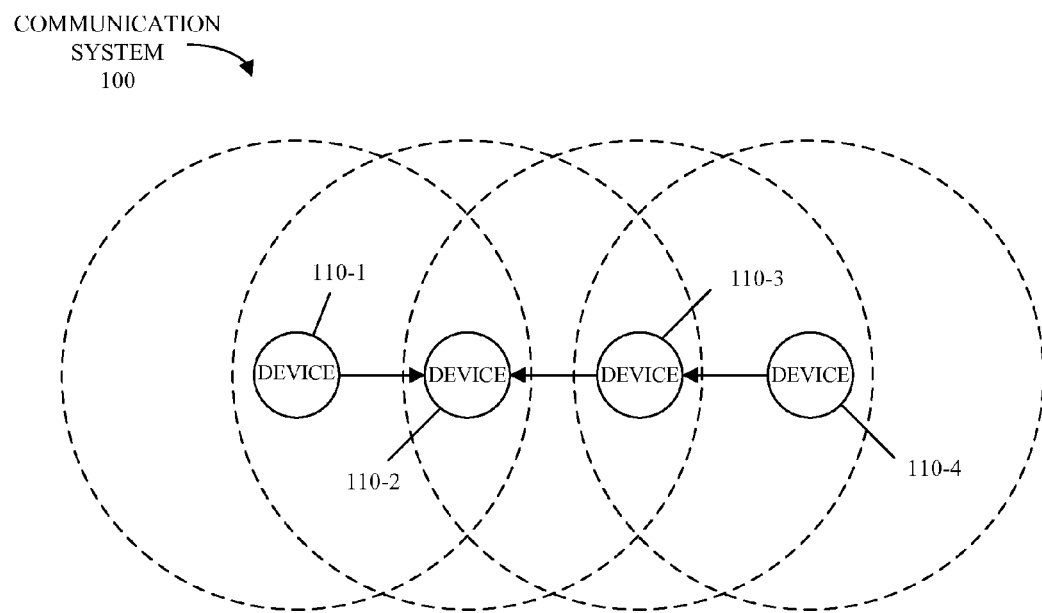
FIG. 1 is a block diagram illustrating a communication system in accordance with an embodiment of the present invention.

Table 1 provides exemplary pseudo-code for an election technique in accordance with an embodiment of the present invention.

Table 2 provides exemplary pseudo-code for a reservation technique in accordance with an embodiment of the present invention.

Table 3 provides exemplary pseudo-code for a reservation-check technique in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and a device for use with the communication system are described. Communication between the devices in the communication system may be enabled by the method. In particular, nodes or devices (henceforth referred to as devices) in a network (such as an ad-hoc network) in the communication system may exchange a dynamic network context via communication with neighboring devices. These devices may use the dynamic network context to determine how network resources are shared during the communication, including performing context-aware packet switching of packets (including data packets) in an information flow.

For example, when establishing an information flow, context packets in the information flow may include constant field values for the information flow, which are associated with multiple protocol layers in a network protocol stack. These constant field values may be stored on the devices. After the information flow has been established, packets in the information flow (such as context packets and data packets) may include a flow identifier, which the devices may use as a pointer to the stored constant field values. In conjunction with context-dependent parameters in the data packets (which depend on the payloads in the data packets), the devices may: redirect the information flow as needed; and, more generally, operate in a distributed fashion to make integrated scheduling, routing and congestion-control decisions for the network (i.e., each device may attempt to optimize the entire network, as opposed to one protocol layer or one device).

In this way, this management technique, which is henceforth referred to as a 'context-aware protocol engine' (CAPE), may be used to reduce the overhead associated with the information flow (especially for information flows in which the payload per data packet is small and/or long-duration information flows). Moreover, CAPE may allow the devices to operate as both hosts and routers, which takes into account the constraints imposed by information flows that include multiple hops, thereby meeting the needs of networks, such as wireless networks and MANETs.

We now discuss embodiments of a communication system. FIG. 1 presents a block diagram illustrating a communication system 100. In this communication system, devices 110 in a network communicate with each other via wireless communication through a sequence of time slots (such as time slots 200 in FIG. 2) in frames (such as frames 210 in FIG. 2). For example, devices 110 may communicate with each other using a TDMA communication protocol.

Each of devices 110 may communicate with a subset of communication system 100. For example, a given device, such as device 110-2, may communicate with neighboring devices in a one-hop, two-hop, or three-hop neighborhood (i.e., these devices may communicate via 0, 1, or 2 intermediary devices).

Devices 110 may collect and store a dynamic network context via communication with neighboring devices. These devices use the dynamic network context to determine how network resources are shared during the communication, including performing context-aware packet switching of packets (including context packets and data packets) in an information flow. When an information flow is being established, the packets may include constant field values for the information flow (which are associated with multiple protocol layers in a network protocol stack), which are stored at devices 110 with the dynamic network context.

Subsequently, after the flow has been established, the packets may include a flow identifier, which is associated with the information flow, instead of the constant field values. This may reduce overhead associated with the information flow. However, the data packets may also include context-dependent parameters which depend on payloads in the data packets.

Moreover, one or more of devices 110, which are in a transmission route or link associated with the information flow, may use the flow identifier to access the stored dynamic network context (including the constant field values) for the information flow. Based on the constant field values and the context-dependent parameters, the one or more devices may perform the context-aware packet switching of packets. For example, if the information flow includes multi-hop communication between two end-point devices in the network via an intermediate device (such as device 110-2), the dynamic network context may be revised on a hop-by-hop basis. Furthermore, the intermediate device may store a complete set of network-context information associated with the information flow (including the constant field values), which allows the intermediate device to redirect the information flow as needed.

Revisions to the dynamic network context may be disseminated by devices 110 prior to transmission of a subsequent packet in the information flow (such as a context packet or a data packet), which allows devices 110 to determine how the network resources will continue to be shared during the communication.

This technique for managing communication in a network, allows devices 110 to operate in a distributed fashion to make integrated scheduling, routing and congestion-control decisions for the network. Thus, CAPE may enable the statistical multiplexing of bandwidth, processing and storage resources in a network.

Note that the dynamic network context may include: information flows competing for shared network bandwidth, devices capable of causing interference at one or more receiving devices, characteristics of one or more links in the network, transmission schedules, transmission routes, and/or device positions. Moreover, the protocol layers in the network protocol stack may include: the physical layer, the data-link layer (which is also referred to as the medium-access-control layer), the network layer, the transport layer, the session layer, and/or the presentation layer. For example, the multiple protocol layers may include the network layer and the medium-access-control layer.

In an exemplary embodiment, the dynamic network context is exchanged using in-band, off-packet integrated signaling, i.e., the separate context packets may be communicated using the same links as the data packets, and the dynamic network context may be used by devices 110 to perform distributed management of shared network resources. Thus, there may be no central authority which regulates the communication in a communication system, as illustrated in the multi-hop ad-hoc network in FIG. 1.

Note that the given device may interfere with another device, such as device 110-3, if this other device is within transmission range. Furthermore, devices 110 may compete with one another for access to a shared communication channel. Therefore, devices 110 may reserve time slots (such as one or more time slots 200 in FIG. 2) using a channel-access protocol, which determines a transmission schedule for the shared communication channel. This transmission schedule may be calculated in a distributed manner (i.e., a decentralized manner) to eliminate contention between devices 110, and to allow reservations. This may allow communication system 100 to obtain high throughput and to guarantee or bound the channel-access delay.

In an exemplary embodiment, the channel-access protocol includes a contention-free scheduling protocol. For example, the channel-access protocol may be a 'context-aware signaling and access' (CASA) protocol. In the CASA protocol, the given device determines which, if any, of the available time slots to reserve or to release based on a dynamic scheduling technique. Based on the reservations, only one device will transmit per time slot in a contending neighborhood. This will ensure that neighbors of the given device, i.e., the possible recipients, will not get interference from their neighbors. To achieve this, devices 110 may use the current dynamic network-context information about their neighborhood, i.e., the devices benefit from knowledge about the local environment in which they operate. Note that the CASA protocol allows time slots (and, more generally, sub-channels) to be reserved without collapsing under load, and also utilizes the channel fully. Furthermore, if the given device has no information to send, it may choose not to participate in an election process. However, if the given device has specific traffic demand, it can choose to reserve certain time slots in future frames. This drastically reduces the uncertainty in the transmission schedule for the given device and, thus, reduces jitter.

Figure 2:
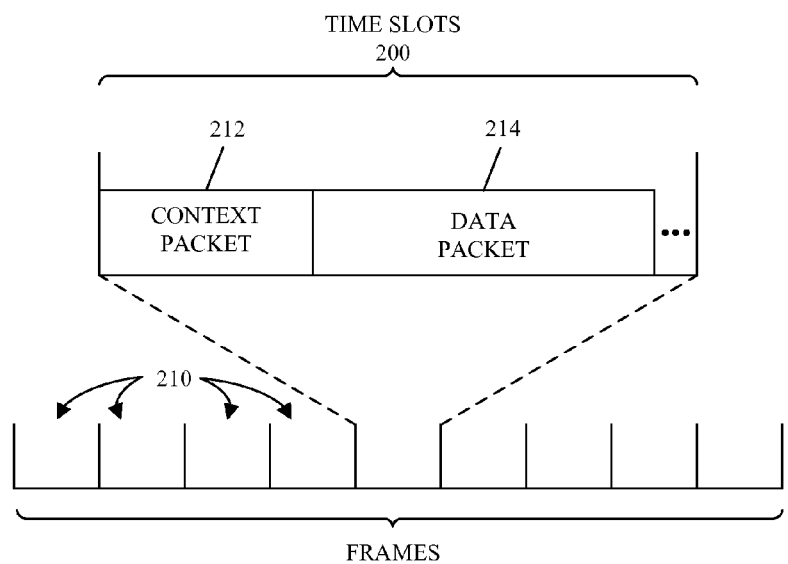
FIG. 2 is a block diagram illustrating frames for use in the communication system of FIG. 1 in accordance with an embodiment of the present invention.

FIG. 2 presents a block diagram illustrating frames 210 for use in communication system 100 (FIG. 1). A communication channel in communication system 100 is divided into multiple sub-channels in the form of frames 210. Each frame may include multiple time slots 200 (which are used as an illustrative example of a type of sub-channel). These time slots may include one or more context packets (such as context packet 212) and/or one or more data packets (such as data packet 214). As noted previously, after the information flow has been established, these packets may include a flow identifier associated with the information flow, and the data packets may include context-dependent parameters which depend on payloads in the one or more data packets. Therefore, these packets directly or indirectly communicate the dynamic network context to receiving devices. For example, each time slot may include information (or pointers to stored information) about: the internal state of devices 110 (FIG. 1), the state of the network (the number of devices, data traffic flows, etc.), and the state of the environment around devices 110 (FIG. 1) in a neighborhood in the network. This context information may be used by devices 110 (FIG. 1) to dynamically: perform context-aware packet switching, determine a transmission schedule, and, more generally, determine how network resources are shared during the communication.

In some embodiments, communication system 100 (FIG. 1) and/or frames 210 (FIG. 2) include fewer or additional components. Moreover, two or more components may be combined into a single component, and/or a position of one or more components may be changed. For example, the number of time slots per second that are communicated depends on timing and hardware. A time slot could be anywhere from 0.5 to 500 ms depending on how well the hardware keeps clocks synchronized between devices 110 (FIG. 1). Thus, the number of data packets 214 (FIG. 2) in frames 210 (FIG. 2) may vary in different embodiments.

This synchronization technique may be utilized in a wide variety of communication systems and applications, including: local-area networks or LANs (such as WiFi, WiMax, and/or a LAN that utilizes a communication protocol that is compatible with an IEEE 802 standard), wide-area networks or WANs, metropolitan-area networks or MANs, and/or cellular telephone networks (such as the Global System for Mobile communication or GSM). In addition, communication system 100 (FIG. 1) may include fixed and/or mobile devices. Thus, the communication protocol and channel-access protocol may need to adapt as the network topology changes, i.e., communication system 100 (FIG. 1) may be dynamic. Moreover, this network topology may be regular (such as one with fixed cells) or random (such as an ad-hoc network).

Figure 3:
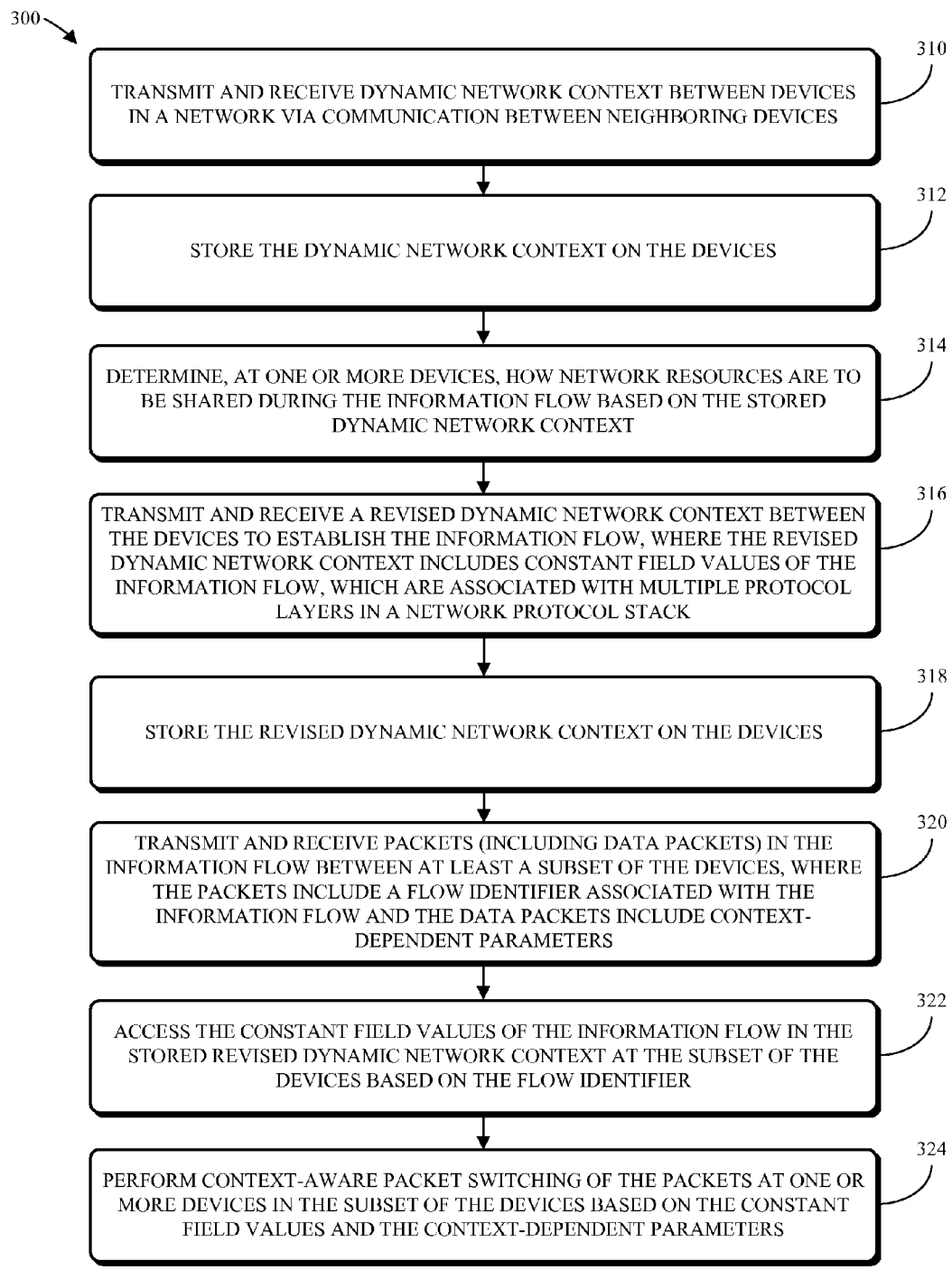
FIG. 3 is a flow chart illustrating a process for reducing overhead associated with an information flow in a network in accordance with an embodiment of the present invention.

We now describe embodiments of a process for reducing overhead associated with an information flow in communication system 100 (FIG. 1). FIG. 3 presents a flow chart illustrating a process 300 for reducing overhead associated with an information flow in a network, which may be performed by the devices in the communication system (such as devices 110 in FIG. 1). During operation, the devices transmit and receive the dynamic network context via communication between neighboring devices (310). Then, the devices store the dynamic network context (312). Next, one or more devices determine how the network resources are to be shared during the information flow based on the stored dynamic network context (314). Subsequently, the devices transmit and receive a revised dynamic network context to establish the information flow (316), and then the devices store the revised dynamic network context (318). This revised dynamic network context includes the constant field values of the information flow, which are associated with the multiple protocol layers in the network protocol stack. For example, for IP, fixed network layer information and medium-access-control layer information (such as the source port, the destination port, the communication protocol, the time-to-live value, an IP fragment, a transmission-control-protocol pipe, a byte offset, etc.) may be communicated once when the information flow is established.

Moreover, at least a subset of the devices transmits and receives packets (including the data packets) in the information flow (320). Note that packets include the flow identifier associated with the information flow and the data packets include the context-dependent parameters which depend on the payloads in the data packets (and thus may vary from one data packet to another). Furthermore, the subset of devices access the constant field values of the information flow in the stored revised dynamic network context based on the flow identifier (322), and one or more of the devices in the subset of devices perform context-aware packet switching of the packets based on the constant field values and the context-dependent parameters (324).

In some embodiments of process 300, there may be additional or fewer operations. For example, when the information flow is taken down, the stored network-context information for the information flow (such as the constant field values) may be removed or erased on the devices. Moreover, the order of the operations may be changed, and/or two or more operations may be combined into a single operation.

Figure 4:
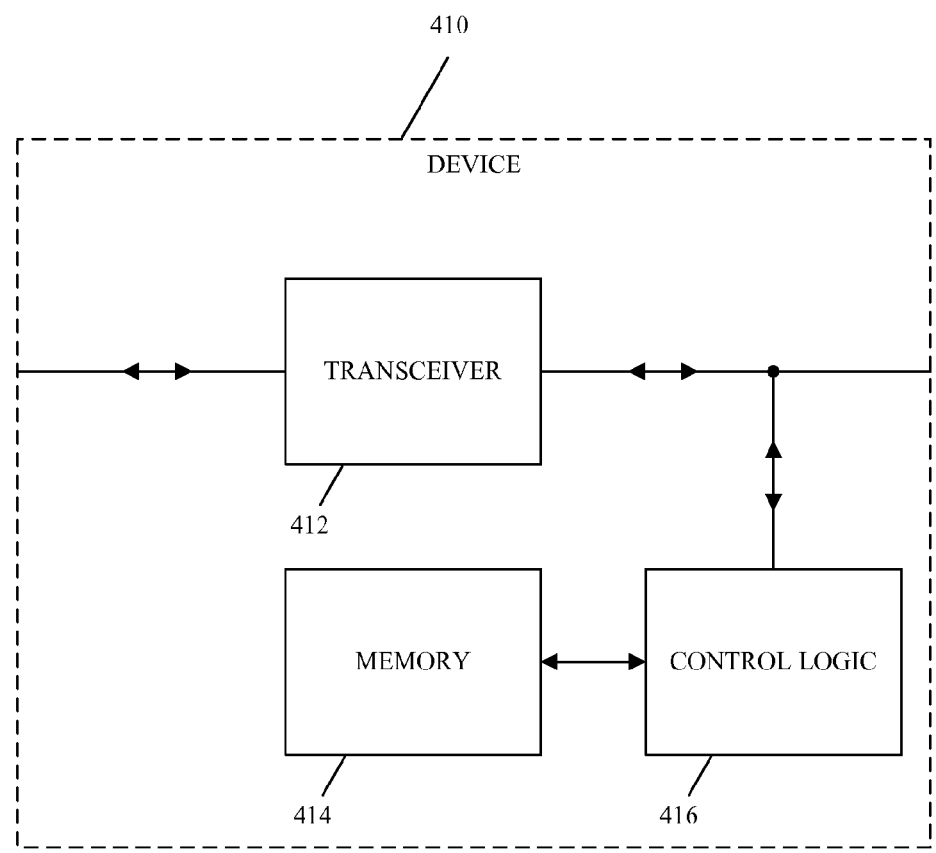
FIG. 4 is a block diagram illustrating a device in accordance with an embodiment of the present invention.

We now describe embodiments of a device for use in communication system 100 (FIG. 1). FIG. 4 presents a block diagram illustrating a device 410. This device includes: a transceiver 412 that communicates the dynamic network context with neighboring devices in the network, memory 414, and control logic 416. Control logic 416 collects the dynamic network context and stores the dynamic network context in the memory 414. Moreover, control logic 416 uses the network context to determine how the network resources are shared during the communication, including the context-aware packet switching of packets (such as the data packets) in the information flow. Furthermore, after the information flow has been established, control logic 416 includes a flow identifier in the packets, which is associated with the information flow, and includes context-dependent parameters in the data packets which depend on payloads in the data packets. Additionally, control logic 416 accesses constant field values of the information flow, which are associated with the multiple protocol layers in the network protocol stack, and which are stored in the dynamic network context in memory 414, based on the flow identifier. These constant field values and the context-dependent parameters are used by control logic 416 to perform the context-aware packet switching.

Figure 5:
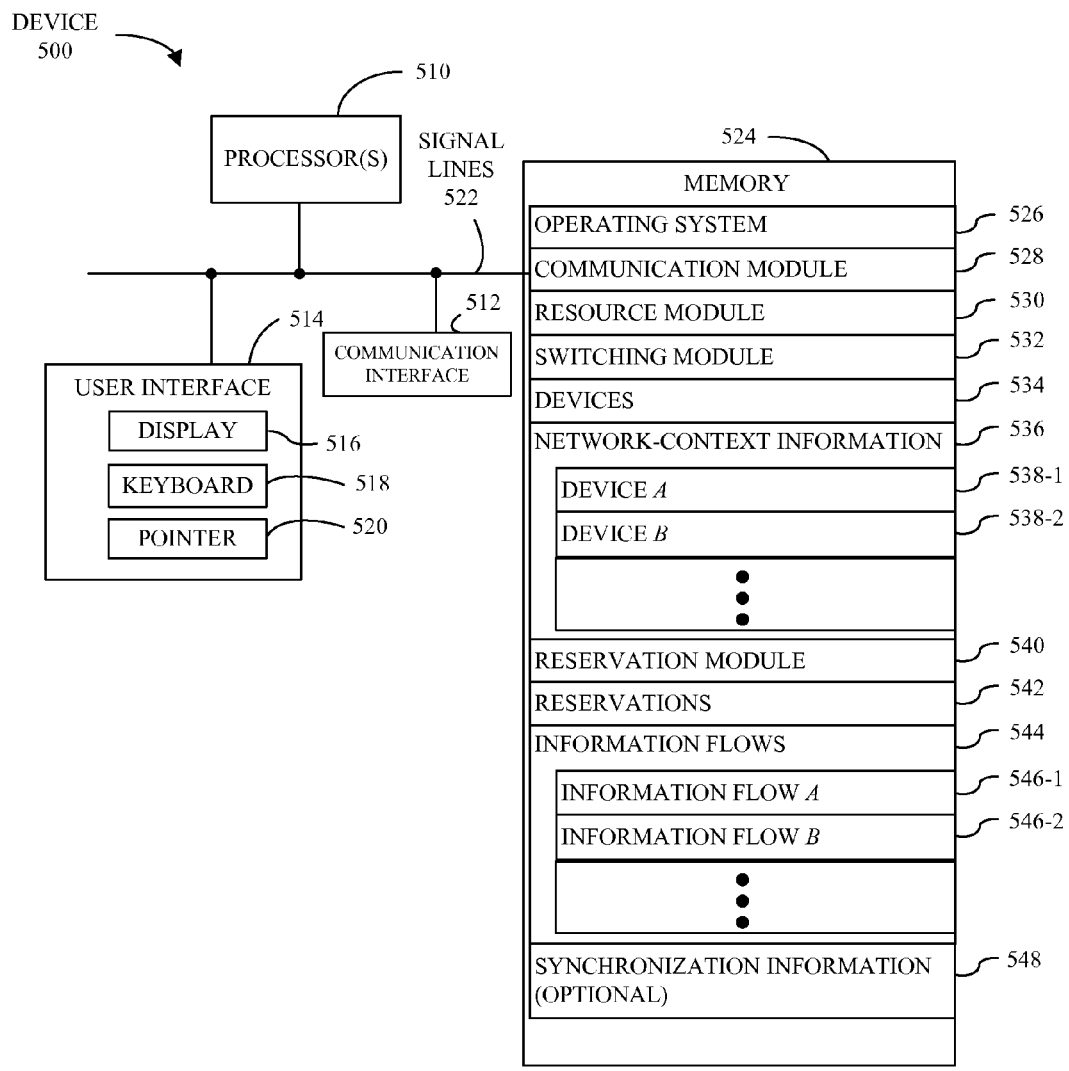
FIG. 5 is a block diagram illustrating a device in accordance with an embodiment of the present invention.

FIG. 5 is a block diagram illustrating a device 500. Device 500 includes one or more processors 510, a communication interface 512, a user interface 514, and one or more signal lines 522 coupling these components together. Note that the one or more processing units 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in the device 500 may include volatile memory and/or non-volatile memory. More specifically, memory 524 may include: ROM, RAM, EPROM, EEPROM, flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. In some embodiments, the operating system 526 is a real-time operating system. The memory 524 may also store communication procedures (or a set of instructions) in a communication module 528. These communication procedures may be used for communicating with one or more computers, devices and/or servers, including computers, devices and/or servers that are remotely located with respect to the device 500.

Memory 524 may also include multiple program modules (or a set of instructions), including: resource module 530 (or a set of instructions), switching module 532 (or a set of instructions) and/or reservation module 540 (or a set of instructions). Device 500 may exchange a dynamic network context with neighboring devices 534 in a network using communication module 528. For example, the dynamic network context may be included in context packets that are exchanged between devices 534. This dynamic network context may be stored in network-context information 536, such as network-context information for device A 538-1 or network-context information for device B 538-2.

As described in process 300 (FIG. 3), resource module 530 may use the network-context information 536 to determine how network resources are shared during the communication between devices 534. For example, network-context information 536 may include constant field values for an information flow (such as one of information flows 544), which are associated with multiple protocol layers in a network protocol stack (such as a network layer and a medium-access-control layer).

Once one of information flows 544, such as information flow A 546-1 or information flow B 546-2, is established, switching module 532 may use the stored constant field values, along with content-dependent parameters in data packets associated with a given information flow, to perform context-aware packet switching of packets. For example, packets in the given information flow, which are received using communication module 528, may include a flow identifier that is associated with the given information flow, and which is used to access the stored constant field values. In this way, overhead associated with the given information flow may be reduced.

Note that revisions to the dynamic network context may be disseminated by devices 534 prior to transmitting a subsequent packet in the given information flow (such as a context packet or a data packet), which allows devices 534 to determine how the network resources will continue to be shared during the communication. This technique for managing communication in a network allows devices 534 to operate in a distributed fashion to make integrated scheduling, routing and congestion-control decisions for the network.

Furthermore, reservation module 540 may allow one or more devices 534 to reserve sub-channels (such as time slots) in subsequent frames, which may be stored in reservations 542. For example, a transmitting device may reserve one or more sub-channels in the network using a contention-free scheduling protocol.

In some embodiments, memory 524 includes optional synchronization information 548 that is used to align or synchronize the sub-channels. For example, synchronization information 548 may include timing information that is provided by a central reference in the network or by an external source. Alternatively or additionally, the synchronization information 548 may include timing information that is determined using distributed mutual synchronization between devices 534.

Instructions in the various modules in memory 524 may be implemented in: a high-level procedural language, an object-oriented programming language, and/or in an assembly or machine language. This programming language may be compiled or interpreted, i.e., configurable or configured, to be executed by the one or more processing units 510.

Although device 500 is illustrated as having a number of discrete items, FIG. 5 is intended to be a functional description of the various features that may be present in device 500 rather than a structural schematic of the embodiments described herein. In practice, and as recognized by those of ordinary skill in the art, the functions of the device 500 may be distributed over a large number of devices or computers, with various groups of the devices or computers performing particular subsets of the functions. In some embodiments, some or all of the functionality of device 500 may be implemented in one or more application-specific integrated circuits (ASICs) and/or one or more digital signal processors (DSPs).

In some embodiments, devices 410 (FIG. 4) and 500 include fewer or additional components. Moreover, two or more components may be combined into a single component, and/or a position of one or more components may be changed. Moreover, the functionality of devices 410 (FIG. 4) and 500 may be implemented more in hardware and less in software, or less in hardware and more in software, as is known in the art.

Figure 6:
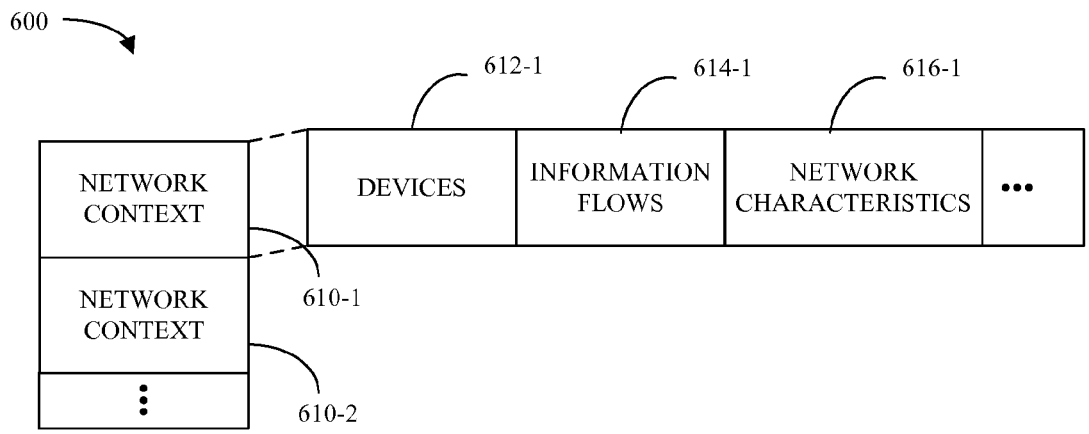
FIG. 6 is a block diagram illustrating a data structure in accordance with an embodiment of the present invention.

We now discuss data structures that may be used in devices 410 (FIG. 4) and 500. FIG. 6 is a block diagram illustrating a data structure 600. This data structure may contain dynamic network contexts 610. For example, dynamic network context 610-1 may include: devices 612-1 (such as devices capable of causing interference at one or more receiving devices), information flows 614-1 (such as information flows competing for shared network bandwidth), and/or network characteristics 616-1 (such as characteristics of one or more links in the network, transmission schedules, transmission routes, and/or device positions).

Figure 7:
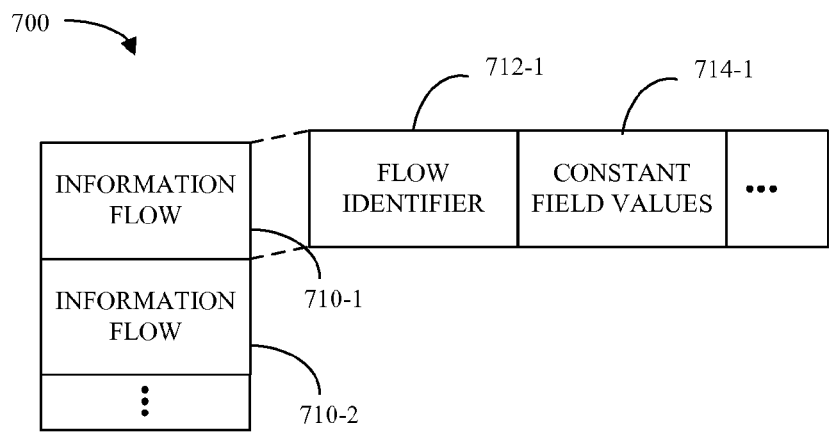
FIG. 7 is a block diagram illustrating a data structure in accordance with an embodiment of the present invention.

FIG. 7 is a block diagram illustrating a data structure 700. This data structure may include fields and/or parameters for information flows 710. For example, information flow 710-1 may include: a flow identifier 712-1 and/or constant field values 714-1 (which are exchanged when information flow 710-1 is being established, but which are subsequently excluded from packets in information flow 710-1).

In some embodiments, data structures 600 (FIG. 6) and 700 include fewer or additional components. Moreover, two or more components may be combined into a single component, and/or a position of one or more components may be changed.

We now describe an exemplary embodiment in which CAPE and CASA are applied in a wireless network, such as a MANET. In contrast with wired networks, scheduling, routing, congestion control and retransmission control are interrelated in a MANET. In effect, a transmission schedule defines a 'link' between a transmitter and a receiver. Moreover, once established, a transmission route dictates the maintenance of links and the decay of others, and therefore impacts the transmission schedules. Additionally, congestion on the links is determined by the transmission routes, and changing these transmission routes or the allocation of traffic impacts the congestion. Therefore, the sharing of resources and the exchange of information may be based on the network context and the channel access, and channel access may be performed jointly with the other network-control functions. Accordingly, in CAPE, the network protocol stack may be replaced with: a network-context data set storing the network context within which user information is disseminated and network resources are shared; the CASA protocol, which is used to access the shared channel and disseminate the network context and user information; and a set of network-control techniques. This network-context data set may include information about: the information flows that are competing for shared bandwidth, the devices capable of causing interference around receivers, link characteristics, device positions (if available), transmission schedules and routes, other characteristics of the environment that may also help define the network context, and/or state information used by network-control techniques.

CASA may integrate the signaling required for channel access, routing, congestion control, and retransmission control, i.e., instead of having a medium-access-control protocol, a unicast routing protocol, a multicast routing protocol, and a congestion control protocol, each of which carrying its own signaling information independently of the others, devices may exchange their network context with each other using CASA. This network context may include all of the control information that is needed to perform integrated scheduling, routing and congestion control decisions.

Although CASA supports the signaling for multiple functions, the techniques used to implement different network-control functions typically are not integrated into a single technique, because such an optimization problem may be too complicated.

In CASA, channel access may be based on distributed elections and opportunistic reservations of time slots based on the network-context information each device maintains locally and exchanges with its immediate neighbors. This approach is based on a couple of reasonable assumptions. First, given that contention should be unnecessary with the proper network context, a contention-free scheduling technique can use network-context information much more efficiently than a contention-based scheduling technique. Second, the maximum throughput of context-aware scheduling for channel access can be orders of magnitude higher than contention-based scheduling (which may be degraded to that of the ALOHA or slotted-ALOHA network throughput under hidden terminals). If n−1 devices are the meaningful sources of multiple access interference (MAI) around a given device, and if such a device has y 'intelligible neighbors' (i.e., devices whose transmissions can be decoded by the given device in the absence of transmissions from the same subset of neighbors), then the maximum throughput around that device is of order $O(y/n)$, where y and n have the same order of magnitude in either sparse or dense networks, because they are both functions of radio propagation characteristics and physical device density.

Devices in CAPE may establish independent state-making decisions by interacting only with their immediate neighbors. However, the network context of a device in CAPE may span multiple layers.

Figure 8A:
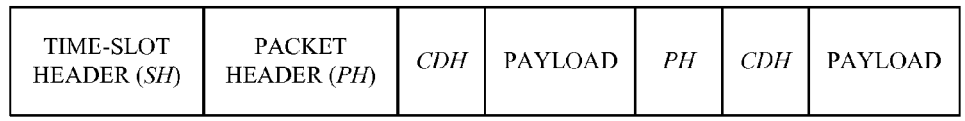
FIG. 8A is a block diagram illustrating a packet header in accordance with an embodiment of the present invention.

CASA may use a time-slotted channel organized into frames, each consisting of a fixed number of time slots. Each time slot may be identified by its order in the frame and the unique frame identifier. This frame identifier may be globally unique and may be based on common knowledge, such as the time (e.g., based on a timing reference signal provided by the Global Positioning System). A time slot (as illustrated in FIG. 8A, which presents a block diagram illustrating a packet header 800) may consist of a time-slot header (which describes the time slot, and provides the minimum network context needed for understanding the contents), and a train of one or more packets. These packets may include a fixed packet header and a variable length context-dependant header. Some of these packets may be plain data packets. However, others may be context packets. Moreover, there may be two main types of context packets, environment context packets and flow context packets.

Environment context packets may include information about local neighbors and transmission routes. They may be transmitted periodically, and may include routing tables and the neighborhood information required by the scheduler. On the other hand, flow context packets may relate information about a specific information flow. They may be used to setup, update and teardown the network-context information that is used to forward the actual data in the information flow.

Figure 8B:
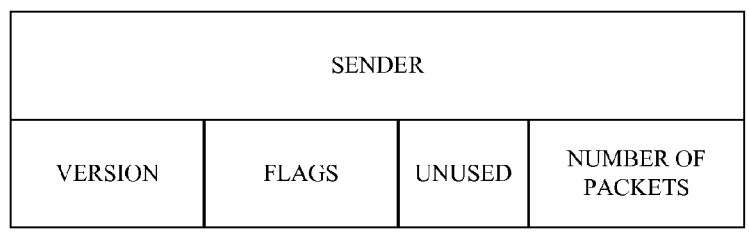
FIG. 8B is a block diagram illustrating a time-slot header and a packet header in accordance with an embodiment of the present invention.
Figure 8B:
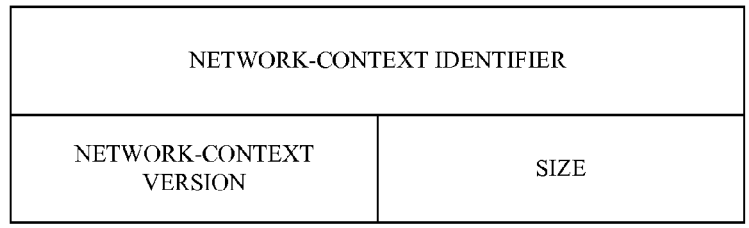

Components of a time-slot header 830 and a packet header 860 are shown in FIG. 8B. Time-slot header 830 may include: which device is the sender, what version of CASA is being used, control flags, and/or the number of packets in the time slot. For example, one of the flags may be the reserved bit flag, which indicates that the device transmitting time-slot header 830 has reserved the time slot. Packet header 860 may include: a network-context identifier of the network context within which a packet should be processed, the version of the network-context identifier, and/or the size of the packet. With this information, a device can determine the format of the context-dependant header (CDH) and how to process the packet(s). Note that the CDH may include a link sequence number. In an exemplary embodiment, time-slot header 830 and packet header 860 each include 32 bits.

In order to decipher packets, a device needs the appropriate network context. For example, the network context may include one or more pre-established network contexts. These may include the network context for interpreting environment context packets, as well as setup packets. These examples are bootstrapping network contexts.

Figure 9:
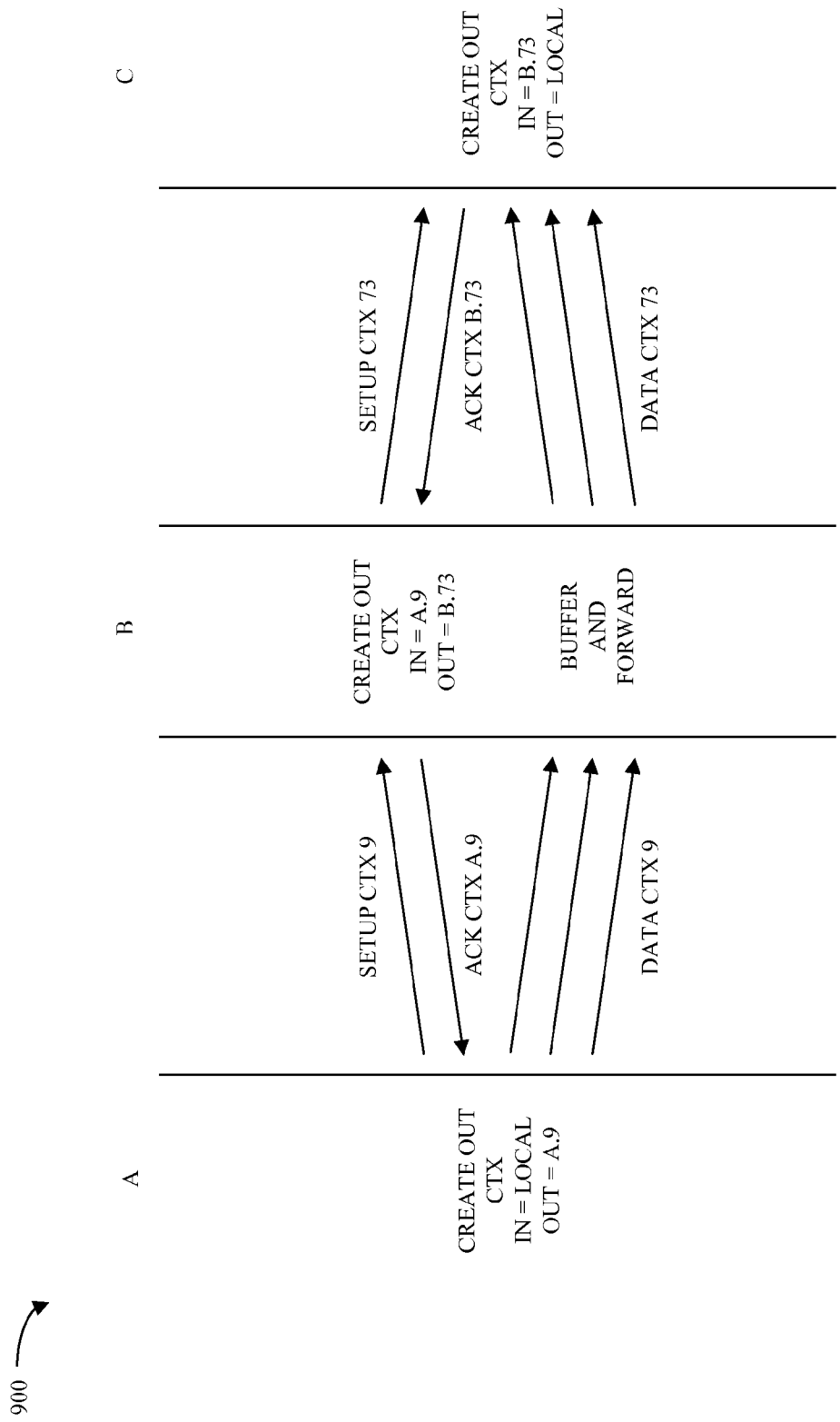
FIG. 9 is a drawing illustrating a process for exchanging a dynamic network context for an information flow in a network in accordance with an embodiment of the present invention.

In order to establish information flows, a network context needs to be established. This may be accomplished using network-context setup packets. FIG. 9 presents a drawing illustrating a process 900 for exchanging a dynamic network context for an information flow in a network. In this process, device A wants to create an information flow to device C. Based on the routing table, it decides to communicate via device B. To do so, device A creates a local network context with an outgoing network-context identifier of 9. Moreover, device A sends a setup packet to device B, which creates the network context and sends an acknowledge (ack) message. Then, device B determines the device corresponding to the next hop. Device B continues to construct the information flow and sends a setup packet to device C. Data arriving at device B has network-context identifier A.9. This information is buffered and sent out with network-context identifier B.73.

As soon as device B has established the network context, data may start flowing from device A to device B. Note that device A does not need to wait until the final destination, device C, has established anything.

In CAPE, a source identifies an information flow by a globally unique flow identifier (FID), and the FID is propagated through the network as part of the connection setup. Note that the FID is not the same as the origin/destination identifiers, but takes a role more akin to an IP-socket descriptor that uniquely identifies an information flow between end points. Once a pair of neighbors along a transmission route agrees on the setup, they may switch the information flow based on the network-context identifier. Moreover, because devices know the FID associated with specific peer connections, devices may multiplex an information flow over multiple transmission routes, and each switching device may become an N-input/M-output virtual switch for each information flow.

In CAPE, the cost of transmission route repairs may be minimized because devices can locally re-route an information flow using the FID. Additionally, setup packets may be used to build the network context. In particular, they allow different types of information flows to be established.

Figure 10:
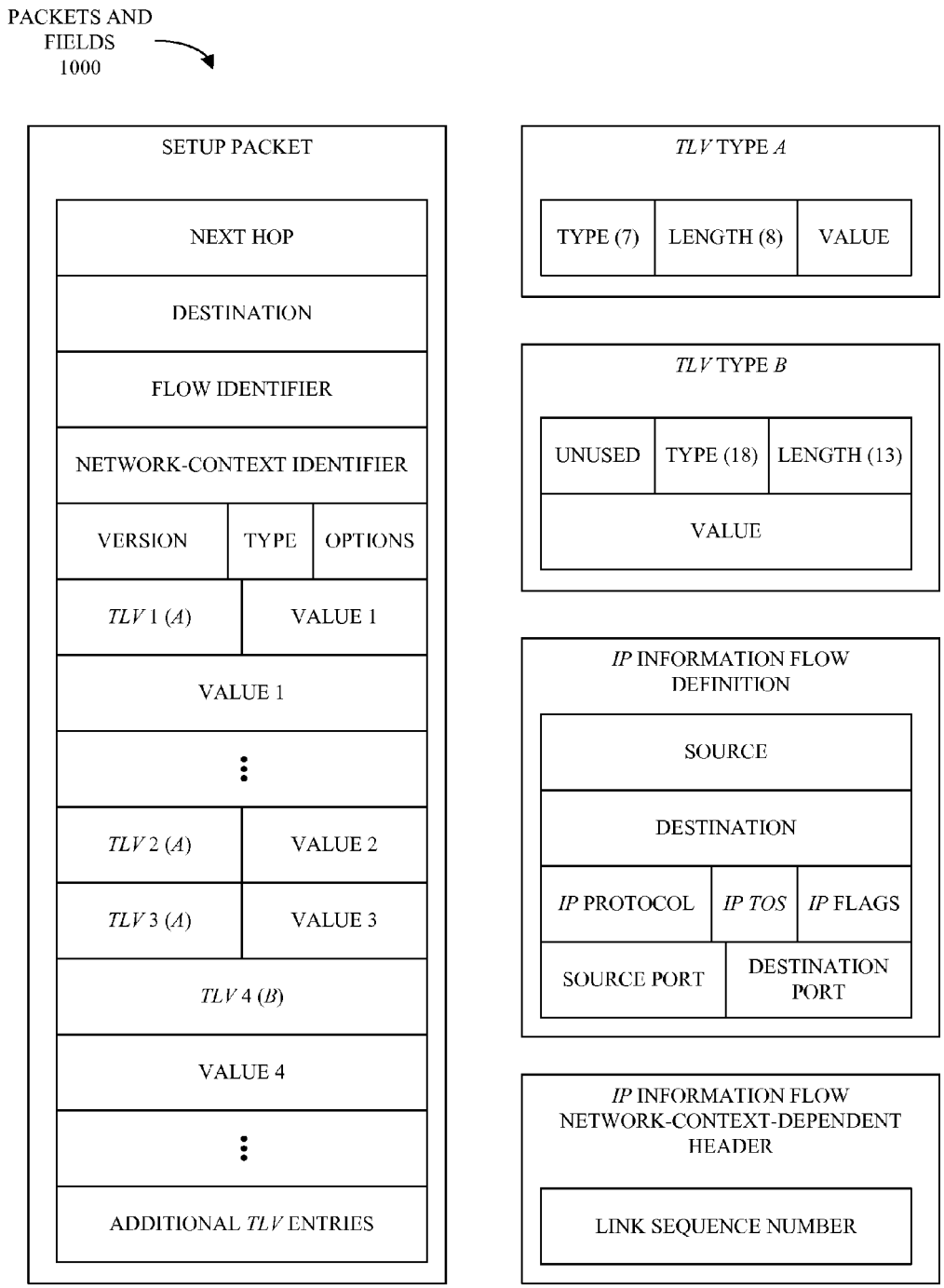
FIG. 10 is a block diagram illustrating packets and fields in accordance with an embodiment of the present invention.

FIG. 10 presents a block diagram illustrating packets and fields 1000. In the setup packet, 'next hop' indicates for whom the packet is intended. Moreover, 'destination' is the destination of the information flow, 'flow identifier' is the globally unique identifier for this information flow, and 'network-context identifier' is the identifier that is used in subsequent data packets (for example, '9' in the previously described hop from device A to device B). Additionally, 'version' indicates which version of the network context is being used, and 'type' indicates the kind of information flow (for example, an encapsulated IP flow or CAPE native).

Setup packets also contain a set of type-length-value (TLV) entries that define the information flow and create the network context. Two types of TLV entries may be differentiated by their first bit. Type A uses 7 bits for 'type' and 8 bits for 'length.' Typically, this is used for the most common options. Type B uses 18 bits for 'type' and 13 bits for 'length,' which is used to handle extended options. In most setup packets, the TLV entries typically include the information-flow definition (in FIG. 10, IP information flow definition is used as an example).

Note that the network context may define how to interpret the CDH, which may include information that needs to be processed specifically for this information flow. In the case of an IP information flow, the header may include a 'link-sequence-number' field. This is a sequence number for the packets in this information flow on a specific link. It is typically used for link retransmissions and information-flow control. In some embodiments, the CDH is customized and modified using network-context options. This feature may be used with other types of information flows, such as native CAPE. In an exemplary embodiment, packets and fields 1000 each include 32 bits.

We now describe exemplary embodiments of CASA. In the discussion that follows, the term 'election' refers to a technique for assigning sub-channels to multiple competing devices in the communication system, and the term 'reservation' refers to a technique in which a device that has won a sub-channel in an election communicates to other devices in the communication system that it intends to use the sub-channel for one, two, or more frames. Furthermore, a 'scheduling protocol or a 'scheduling technique' may include an election technique and/or a reservation technique.

CASA provides access to a shared channel by means of elections and reservations based on the network-context information exchanged between devices. These devices implement a distributed election technique to select which device is allowed to use which time slot based on their shared network context, without configuring anything in the schedule other than the number of time slots used in each frame. In some embodiments, the election technique takes the list of unique neighbor identifiers and hashes them with the time-slot number. Because time slots are uniquely numbered, this gives each device a specific result for each time slot. Moreover, the device with the highest result may be considered the winner of the election, with ties broken by the device identifier. Note that the network context used for the election of time slots can include: the devices around the neighborhood of a device, the information flows that each device offers to the shared channel, the correlation between information flows, and/or the location of the devices. Additionally, note that the information flows may be: unicast, multicast and/or broadcast, and may have very different constraints (e.g., voice may have strict delivery deadlines, while data may have bandwidth constraints and persistence or duration).

Because a device's election result is calculated by all devices that know the device, all of its two-hop neighbors calculate the same result for this device. This ensures that no two devices sharing a neighbor win the election simultaneously (if the network context is up to date). Consequently, in a two-hop neighborhood, only a single device transmits on a single time slot. Note that multiple packets can be transmitted in a single time slot. Moreover, all devices may listen on all time slots, so a single time slot can contain packets directed at different or multiple receivers. Devices may use the schedule that they compute to avoid communicating redundant control information, and may reinforce and update the network-context information that they share with each other in order to make their transmission schedules self-configuring and adaptive.

In the event that a device does not have a lot of information to send, it can include in the network context the maximum number of time slots it wishes to win in the current frame. This means that, if the device wins that number of time slots in the election process, it is ignored during future elections in that frame.

To provide channel-access-delay guarantees, a device can reserve time slots after winning access to them through the election process. If a device knows that it has a certain traffic demand it wants to meet, it may try to reserve time slots. When a device wins a time slot, it can choose to reserve it. This guarantees that the time slot is assigned to this device in future frames. To make a reservation, the device may include a reservation note in the network-context information, which indicates that it wishes to reserve a particular time slot. Based on this communication, the device considers the time slot reserved, unless another device reports a conflict. Furthermore, any subsequent transmissions on that time slot are flagged as reserved, so that other devices know that that time slot is not electable.

When a device receives a reservation from a one or two-hop neighbor, it records it and re-broadcasts the reservation by including in its revised network context that time slot X was reserved by device Y. When a device receives a reservation from a device that is not a one- or two-hop neighbor, it may record the reservation but may not re-broadcast it. Based on this information, a receiving device can conclude that the device that re-broadcasts the reservation will not be participating in the election of the time slot in question, and hence can be removed from future elections of that time slot.

Given that devices in a MANET are mobile, transmission schedules may need to adapt as the topology changes. Consequently, the schedule, reservations and neighbor lists may be periodically refreshed. Note that reservation conflicts may need to be resolved as devices move. For example, a device can come into an area where some of its reserved time slots conflict with another device's reservations. Under typical conditions, this conflict can be resolved slowly because a (new) mutual neighbor detects the conflict. This neighbor may determine the winner (based on the device identifier) and may inform both devices which one has won that time slot.

If the network-context information is not up to date, collisions may occur. Consequently, the network may need to ensure that the information on the devices is current. Stale state information can occur when a device moves into an area and other devices in that area have not yet updated their neighbor list. When a collision is detected, devices detecting the collision re-broadcast in their next scheduled time slot what they believe should have happened in the collision time slot. For example, a neighbor may retransmit the reservation it believes is current for the collision time slot in its next context packet. In this way, the devices that created the collision can determine which device should have transmitted and take appropriate action.

In order to maintain a fair environment, devices may be individually limited to a maximum number of reservations. Moreover, for a given time, only a certain percentage of the time slots can be reserved in a frame. Devices may not reserve time slots if this puts them over their individual limit.

When a new device joins the network, it may first spend a frame listening for traffic. This will give the device partial topology and state information about the scheduling context. With this information, it can calculate elections for the following frame. Then, it may try to transmit on a time slot where it wins the election. This can create a collision because the new device may only have partial topology information, but once one of the neighbors hears its transmission it will add it to the list of devices, which effectively adds the new device to the schedule. Next, this list of devices is shared, and soon all devices know of its existence and participation.

We now describe exemplary embodiments of election and reservation techniques that may be used in CASA. Table 1 provides exemplary pseudo-code for an election technique for a device N at time t. In this technique, time t is a structured variable in the form (t.frame, t.slot), where t.frame identifies the frame over all time and t.slot is a cyclical counter over each time-slot number $\{0 \ldots k\}$ in a frame. Note that hash function hash(i, t) computes the election hash for device identifier i and time t, considering both the frame and time-slot structure of t.

TABLE 1

```
Election(N, t)
  maxv = 0;
  elected = φ;
  if N.reserved[t.slot] ≠ 0;
    elected = N.reserved[t.slot];
  else;
    for each i ∈ N.contend;
      if i ∉ N.excluded[t.slot];
        v = hash(i, t);
        if elected = φ;
          maxv = v;
          elected = i;
        else if v = maxv and i > elected;
          elected = i;
        else if v > maxv;
          maxv = v;
          elected = i;
  return elected;
```

Furthermore, set N.contend is the set of devices in the contention region for device N. This set contains the device N and all one-hop and two-hop neighbors contending for time slots. Array N.reserved[s] stores the device identifier of the reservation owner for a particular time slot s, which is known at device N. This array may be an empty set or a singleton. Furthermore, array N.excluded[s] includes a set of device identifiers that device N believes should not be eligible to contend for time slot s. Maintenance of N.excluded[s] and N.reserved[s] are described below.

In the election for time t, each device N checks to see if it believes time slot t.slot is reserved. If this is the case, the device holding the reservation wins the election. However, if the time slot is not reserved, device N iterates over all contending devices N.contend, excluding devices in the set N.excluded[t.slot]. For each contending device i included in this iteration, the value v is its election value for time t, as computed using the election hash function. Note that the election technique tracks the device identifier elected with the largest value of v. Furthermore, ties are broken using device-identifier ordering. Then, the election technique returns the device identifier that wins the time slot or NULL (φ) if no device is elected.

Note that each device maintains the array N.reserved[ ] for each cyclic time slot value $\{0 \ldots k\}$. In an exemplary embodiment, k=99. Note that when a device is initialized, it sets $\forall i \in \{0 \ldots k\}$ N.reserved[i]=φ.

Table 2 provides exemplary pseudo-code for a reservation technique for a device N. This technique is executed when device N receives a reservation R (or generates it locally) and has processed topology information in the same network context as R (thereby ensuring that the reservation-owner topology is up to date). Note that reservation R is the tuple {owner, time slot, time, last hop}, where R.owner is the device claiming cyclical time slot R.slot, R.time is the time (t.frame, t.slot) at which owner R.owner claimed time slot, R.slot, and R.lasthop is the device broadcasting time slot R.slot in its network context.

TABLE 2

```
Book Reservation(N, R)
  if N.owner ∉ N.contend;
    N.excluded[R.slot] = N.excluded[R.slot] ∪ R.lasthop;
  else if N.reserved[R.slot] =φ;
    N.reserved[R.slot] = R.owner;
    N.ResExpire[R.slot] = R.time + RESTIME;
    N.excluded[R.slot] = R.lasthop;
  else if N.reserved[R.slot] = R.owner;
    N.ResExpire[R.slot] = R.time + RESTIME;
    N.excluded[R.slot] = N.excluded[R.slot] ∪ R.lasthop;
  else;
    v1 = hash(N.reserved[R.slot], R:slot);
    v2 = hash(R.owner, R.slot);
    if v2 > v1 or (v2 = v1 and R:owner > N.reserved[R.slot]);
      N.reserved[R.slot] = R.owner;
      N.ResExpire[R.slot] = R.time + RESTIME;
      N.excluded[R.slot] = R.lasthop;
```

Furthermore, in this technique a device maintains up to three data structures, N.reserved[ ], N.ResExpire[ ] and optionally N.excluded. N.ResExpire[ ] tracks the soft state of the reservation for time slots s, because the reservation must be updated at least every RESTIME time units, otherwise the reservation will expire. If the reservation owner is not in the contender set for device N, for example, if owner R.owner is a three-hop neighbor, then device N can exclude device R.lasthop from elections for time slot R.slot without reserving time slot R.slot. Because device R.lasthop is aware of the reservation for time slot R.slot, it will not contend for this time slot. Furthermore, because owner R.owner is not in the contender set R.contend, device N does not need to grant (or deny) the reservation.

If a time slot is not reserved and the reservation owner is a contending device, device N sets owner R.owner as the reservation holder and updates the expiration time. Then, device N excludes device R.lasthop from all elections for time slot R.slot because device R.lasthop, which has the same reservation as device N, will not contend for the time slot. However, if a time slot is already reserved and the reservation is for the same owner R.owner, device N adds device R.lasthop to the exclusion set for time slot R.slot and updates the soft state for N.ResExpire[ ].

If the reservation R conflicts with an existing reservation, the device N conducts a mini-election between the conflicting devices and chooses one to own the time slot. In some embodiments, this mini-election is based only on the time of time slot R.slot and not on a full-frame time. This is because the election may be frame independent. Note that if the new reservation R wins the mini-election, device N updates its soft state and resets the exclusion set R.exclude to be the new last hop.

At the end of every frame, each device N executes a soft-state reservation check. Table 3 provides exemplary pseudo-code for a reservation-check technique. Note that if a reservation expired in the previous frame, the soft state is cleared.

TABLE 3

Maintenance(N, t)
  for s = 0 to k;
    if N.ResExpire[s] < t;
    N.reserved[s] = φ;
    N.excluded[s] = φ;

While the preceding discussion has used one-hop and two-hop neighborhoods as an illustration, in other embodiments the contention neighborhood may include additional hops. For example, in some embodiments the contention neighborhood includes three or more hops.

The performance of CASA was evaluated theoretically using a QualNet simulator (from Scalable Network Technologies, Inc., of Los Angeles, Calif.) for a network with 36 devices and the same physical layer as in IEEE 802.11b. In these simulations, CASA did not differentiate the different types of data traffic, i.e., all traffic was treated equally. Transmission control protocol (TCP), constant bit rate (CBR), and voice over Internet protocol (VoIP) were used as illustrative data traffic examples. Furthermore, the time slot size was 1 ms, time slots per frame was 100, and time slot maximum transmission unit (MTU) was 1000 bytes. In addition, the maximum number of reservable time slots per device was 50, the interference neighborhood included 3 hops, neighbor expiration was 500 ms, reservation expiration was 300 ms, and network initialization was 2 s. Note that the simulations were performed 10 times with different random seeds, which included location for random-topology experiments.

Results indicate that CASA provides high channel utilization and a low average delay (for example, 11 ms to cross four hops) over a wide range of data flows, including different data rates and data-packet sizes. As expected, CASA performed well at high loads, such as 20 kbps flows across TCP sessions or CBR traffic. In addition, CASA performed well in cross-traffic data flows, thereby allowing multiple data flows to cooperate and share the channel.

In some embodiments, the CASA architecture is further optimized across network and transport layers, for example, using context-aware packet switching and transport protocols. This may further improve scheduling behavior, and may allow utility tradeoffs between data-traffic information flows. For example, CASA may generate topology events for the routing and higher layers in the network architecture. Furthermore, it may detect when devices enter and leave transmission range. Therefore, CASA may determine if a packet is going to a next hop that is unreachable. In this case, certain devices that come in and/or out of range (for example, due to mobility or noisy links) may be tagged as unreliable, and communication to them may be blocked until the link becomes stable. Note that these devices may still be counted during elections because they can still cause interference.

In some embodiments, CASA is extended to include: reservation release optimization, reservations in the future, dynamic reservation caps, neighborhood reservation caps, optimizing for devices that do not want or cannot participate in the schedule, and/or optimizing of header exchanges. Furthermore, in other embodiments, CASA includes mobility optimizations and/or data priorities.

Note that while CASA has been described using several dynamic election or scheduling techniques, other techniques, such as cyclical, random or pseudo-random permutation, may be used to determine which devices win which sub-channels. For example, in some embodiments a given device in the communication system dynamically determines which of the sub-channels to reserve based on usage probabilities for the sub-channels that are accumulated in multiple frames and/or based on a ranking of a permutation of sub-channel identifiers for competing devices.

While the preceding embodiments have used TDMA as an illustrative example, in other embodiments the technique for managing communication can be extended to frequency division multiple access (FDMA), code division multiple access (CDMA), and/or spatial diversity communication protocols.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
devices in a network that are configured to collect and store a dynamic network context by exchanging environment context packets and flow context packets with neighboring devices, wherein the environment context packets include information for routing and scheduling, and the flow context packets include information for forwarding a specific end-to-end data flow between two end-point devices in the network;
wherein the devices are configured to use the dynamic network context to determine how network resources for the end-to-end data flow are assigned during communication;
wherein the communication involves context-aware switching of data packets in the data flow;
wherein the data packets include context-dependent parameters which depend on payloads in the data packets; and
wherein, after the data flow has been established, the devices are configured to exclude constant field values, which are associated with multiple protocol layers in a network protocol stack, from the data packets, thereby reducing overhead associated with the information flow.

2. The communication system of claim 1, wherein the network includes an ad-hoc network.

3. The communication system of claim 1, wherein the communication includes wireless communication.

4. The communication system of claim 1, wherein the dynamic network context includes:
data flows competing for shared network bandwidth;
devices capable of causing interference at one or more receiving devices;
characteristics of one or more links in the network;
constant field values for the data flows;
transmission schedules; and
transmission routes.

5. The communication system of claim 4, wherein the dynamic network context includes at least one physical parameter, which can include one or more of: device positions, remaining battery life, and direction of mobility.

6. The communication system of claim 1, wherein the communication uses a time-division multiple-access (TDMA) communication protocol.

7. The communication system of claim 1, wherein a transmitting device reserves one or more sub-channels in the network using a contention-free scheduling protocol.

8. The communication system of claim 7, wherein the sub-channels include one or more time slots.

9. The communication system of claim 1, wherein the data flow includes multi-hop communication via an intermediate device.

10. The communication system of claim 9, wherein the dynamic network context is revised on a hop-by-hop basis.

11. The communication system of claim 9, wherein the intermediate device stores a complete set of context information associated with the data flow, which allows the intermediate device to redirect the data flow as needed.

12. The communication system of claim 4, wherein context packets and the data packets in the data flow include a flow identifier corresponding to the data flow which allows devices in a transmission route associated with the data flow to access the constant field values.

13. The communication system of claim 1, wherein the devices are configured to disseminate a revision to the dynamic network context in the network prior to transmitting a subsequent packet in the data flow, which can be a context packet or a data packet, to allow the devices to determine how the network resources will continue to be assigned to the data flow during the communication.

14. The communication system of claim 1, wherein while determining how the network resources are shared assigned to data flows during the communication, the devices are configured to operate in a distributed fashion to make integrated scheduling, routing and congestion-control decisions for the network.

15. The communication system of claim 1, wherein the devices are configured to communicate the dynamic network context in context packets which are separate from sets of data packets, which include the data packets, in data flows; and wherein the context packets are communicated using the same links in the network as the sets of data packets.

16. The communication system of claim 1, wherein the multiple protocol layers in the network protocol stack include a network layer and a medium-access-control layer.

17. A device, comprising:
a transceiver configured to create a dynamic network context with neighboring devices in a network by exchanging environment context packets and flow context packets, wherein the environment context packets include information for routing and scheduling, and the flow context packets include information for forwarding a specific end-to-end data flow between two end-point devices in the network;
memory; and
control logic, coupled to the transceiver and the memory, which is configured to collect the dynamic network context and store the dynamic network context in the memory, and which is configured to use the network context to determine how network resources are assigned to the end-to-end data flow during the communication, wherein the communication involves context-aware packet switching of packets, which includes data packets, in the data flow;
wherein, after the information flow has been established, the control logic is configured to include a flow identifier in the packets in the data flow, which is associated with the data flow, and is configured to include context-dependent parameters in the data packets which depend on payloads in the data packets;
wherein the control logic is configured to access constant field values of the data flow, which are associated with multiple protocol layers in a network protocol stack and which are stored in the dynamic network context in the memory, based on the flow identifier; and
wherein the control logic is configured to use the constant field values and the context-dependent parameters to perform the context-aware packet switching.

18. The device of claim 17, wherein the data flow includes multi-hop communication via an intermediate device.

19. The device of claim 18, wherein the dynamic network context is revised on a hop-by-hop basis.

20. The device of claim 18, wherein the intermediate device stores a complete set of context information associated with the data flow, which allows the intermediate device to redirect the data flow as needed.

21. A method for reducing overhead associated with a data flow in a network, comprising:
transmitting and receiving dynamic network context between devices in the network by exchanging environment context packets and flow context packets between neighboring devices, wherein the environment context packets include information for routing and scheduling, and the flow context packets include information for forwarding a specific end-to-end data flow between two end-point devices in the network;
storing the dynamic network context on the devices;
determining, at one or more devices, how network resources are to be assigned to the end-to-end data flow based on the stored dynamic network context;
transmitting and receiving a revised dynamic network context between the devices to establish the data flow; wherein the revised dynamic network context includes constant field values of the data flow, which are associated with multiple protocol layers in a network protocol stack;
storing the revised dynamic network context on the devices;
transmitting and receiving packets, which include data packets, in the data flow between at least a subset of the devices, wherein the packets include a flow identifier associated with the data flow and the data packets further include context-dependent parameters which depend on payloads in the data packets;
accessing the constant field values of the data flow in the stored revised dynamic network context at the subset of the devices based on the flow identifier; and
performing context-aware packet switching of the packets in the data flow at one or more devices in the subset of the devices based on the constant field values and the context-dependent parameters.

* * * * *